United States Patent
Hirao

(10) Patent No.: US 12,080,486 B2
(45) Date of Patent: Sep. 3, 2024

(54) ELECTRONIC COMPONENT

(71) Applicant: Murata Manufacturing Co., Ltd., Nagaokakyo (JP)

(72) Inventor: Takahiro Hirao, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 93 days.

(21) Appl. No.: 17/945,141

(22) Filed: Sep. 15, 2022

(65) Prior Publication Data

US 2023/0091570 A1 Mar. 23, 2023

(30) Foreign Application Priority Data

Sep. 17, 2021 (JP) ................................ 2021-151807

(51) Int. Cl.
*H01G 4/30* (2006.01)
*H01G 4/012* (2006.01)
*H01G 4/248* (2006.01)

(52) U.S. Cl.
CPC ............... *H01G 4/30* (2013.01); *H01G 4/012* (2013.01); *H01G 4/248* (2013.01)

(58) Field of Classification Search
CPC ........... H01G 4/30; H01G 4/012; H01G 4/248
See application file for complete search history.

(56) References Cited

U.S. PATENT DOCUMENTS

| | | | |
|---|---|---|---|
| 2017/0042029 A1 | 2/2017 | Nishimura et al. | |
| 2018/0190435 A1* | 7/2018 | Kishi | H01G 4/30 |
| 2020/0234884 A1 | 7/2020 | Lee et al. | |
| 2021/0335550 A1* | 10/2021 | Ikeda | H01G 2/02 |
| 2023/0093850 A1* | 3/2023 | Yatagawa | H01G 4/012 |
| | | | 361/301.4 |
| 2023/0187137 A1* | 6/2023 | Kyeong | H01G 4/30 |

FOREIGN PATENT DOCUMENTS

| | | | |
|---|---|---|---|
| JP | H0969401 A | * | 3/1997 |
| JP | H0969401 A | | 3/1997 |
| JP | 2010-114385 A | | 5/2010 |
| JP | 2018-190952 A | | 11/2018 |
| JP | 2018186283 A | | 11/2018 |
| JP | 2020-120097 A | | 8/2020 |

OTHER PUBLICATIONS

Office Action in JP2021-151807, dated Oct. 17, 2023, 6 pages.

* cited by examiner

*Primary Examiner* — Michael P Mcfadden

(74) *Attorney, Agent, or Firm* — Keating & Bennett, LLP

(57) ABSTRACT

An electronic component includes a main body including first and second end surfaces opposed to each other in a length direction, first and second side surfaces opposed to each other in a width direction, and first and second main surfaces opposed to each other in a thickness direction and that has a rectangular substantially rectangular parallelepiped shape, a first outer electrode provided at a first end side in the length direction of the main body, and a second outer electrode provided a second end side in the length direction of the main body. Each of the first and second outer electrodes includes first through fourth protrusions.

13 Claims, 11 Drawing Sheets

ELECTRONIC COMPONENT

CROSS REFERENCE TO RELATED APPLICATIONS

This application claims the benefit of priority to Japanese Patent Application No. 2021-151807, filed on Sep. 17, 2021. The entire contents of this application are hereby incorporated herein by reference.

BACKGROUND OF THE INVENTION

1. Field of the Invention

The present invention relates to an electronic component.

2. Description of the Related Art

Electronic components, such as multilayer ceramic capacitors, having a pair of outer electrodes on the surface of its main body have been known. As an example of such electronic components, Japanese Unexamined Patent Application Publication No. 2020-120097 discloses an electronic component 100. In the electronic component 100, a pair of outer electrodes 120 electrically connected to inner electrodes is provided on the surface of a main body 110 in which multiple dielectric layers and the multiple inner electrodes are laminated (refer to FIG. 11). In the electronic component 100, the main body 110 has a substantially rectangular parallelepiped shape and the surface of the outer electrode 120 on each face of the main body 110 is flat, like the surface of the main body 110.

Although protrusions are provided at positions where the outer electrodes 120 are not formed on a portion of the faces of the main body 110 in the electronic component 100 described in Japanese Unexamined Patent Application Publication No. 2020-120097, the protrusions are omitted in FIG. 11.

However, the electronic component in the above related art cannot be smoothly conveyed due to frictional force occurring between the outer electrodes and a conveyance path in conveyance of the electronic component on the conveyance path. Specifically, when the multiple electronic components are supplied to supply positions at the upside of the sloping conveyance path and the electronic components slip down on the conveyance path to be conveyed to discharge positions at the downside of the conveyance path, the electronic components may stay on the conveyance path due to the frictional force between the outer electrodes and the conveyance path.

SUMMARY OF THE INVENTION

Preferred embodiments of the present invention provide electronic components that are each able to decrease frictional resistance against a conveyance path in conveyance of the electronic component on the conveyance path.

An electronic component according to a preferred embodiment of the present invention includes a main body that includes a first end surface and a second end surface opposed to each other in a length direction, a first side surface and a second side surface opposed to each other in a width direction, and a first main surface and a second main surface opposed to each other in a thickness direction and that has a rectangular or substantially rectangular parallelepiped shape, a first outer electrode provided at a first end side in the length direction of the main body, and a second outer electrode provided a second end side in the length direction of the main body. Each of the first outer electrode and the second outer electrode includes a first protrusion protruding in a direction orthogonal to or substantially orthogonal to the first main surface, a second protrusion protruding in a direction orthogonal to or substantially orthogonal to the second main surface, a third protrusion protruding in a direction orthogonal to or substantially orthogonal to the first side surface, and a fourth protrusion protruding in a direction orthogonal to or substantially orthogonal to the second side surface.

With electronic components according to preferred embodiments of the present invention, since each of the first outer electrode and the second outer electrode includes the first protrusion protruding in the direction orthogonal to or substantially orthogonal to the first main surface, the second protrusion protruding in the direction orthogonal to or substantially orthogonal to the second main surface, the third protrusion protruding in the direction orthogonal to or substantially orthogonal to the first side surface, and the fourth protrusion protruding in the direction orthogonal to or substantially orthogonal to the second side surface, the contact area between the outer electrodes and the conveyance path is able to be decreased in conveyance of the electronic component on the conveyance path. Accordingly, it is possible to decrease the frictional resistance between the electronic component and the conveyance path to enable smooth conveyance on the conveyance path.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Features of the present invention will be specifically described using preferred embodiments of the present invention as examples thereof. Multilayer ceramic capacitors are exemplified as electronic components according to the preferred embodiments of the present invention for description.

First Preferred Embodiment

Figure 1:
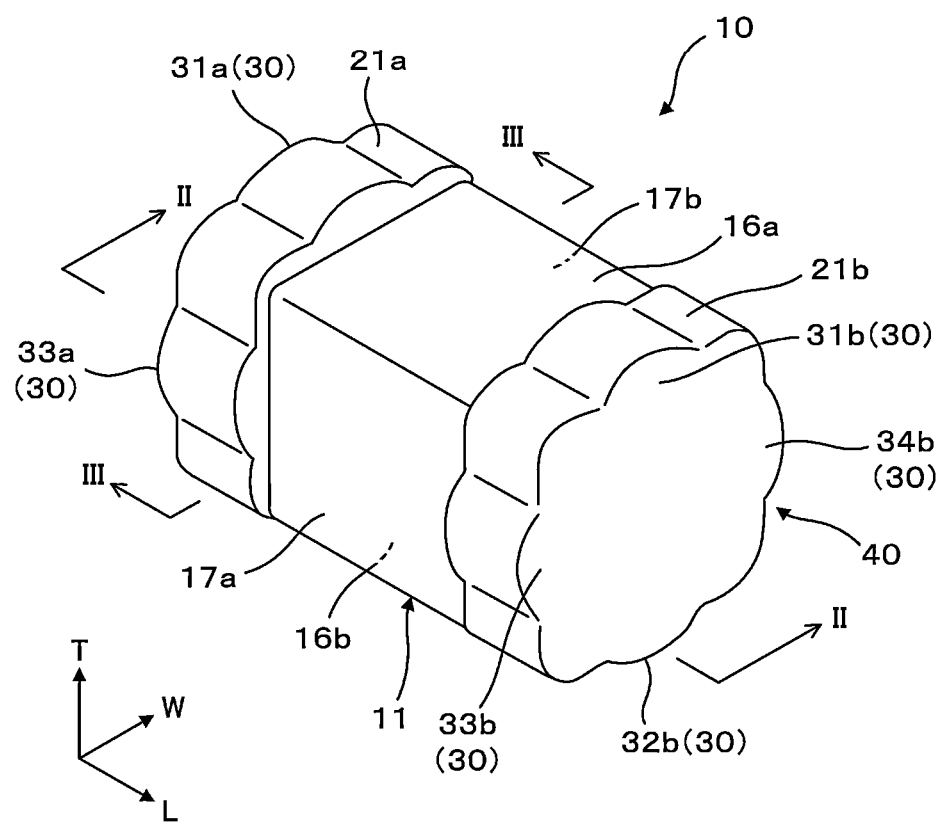
FIG. 1 is a perspective view schematically illustrating an electronic component according to a first preferred embodiment of the present invention.
Figure 2:
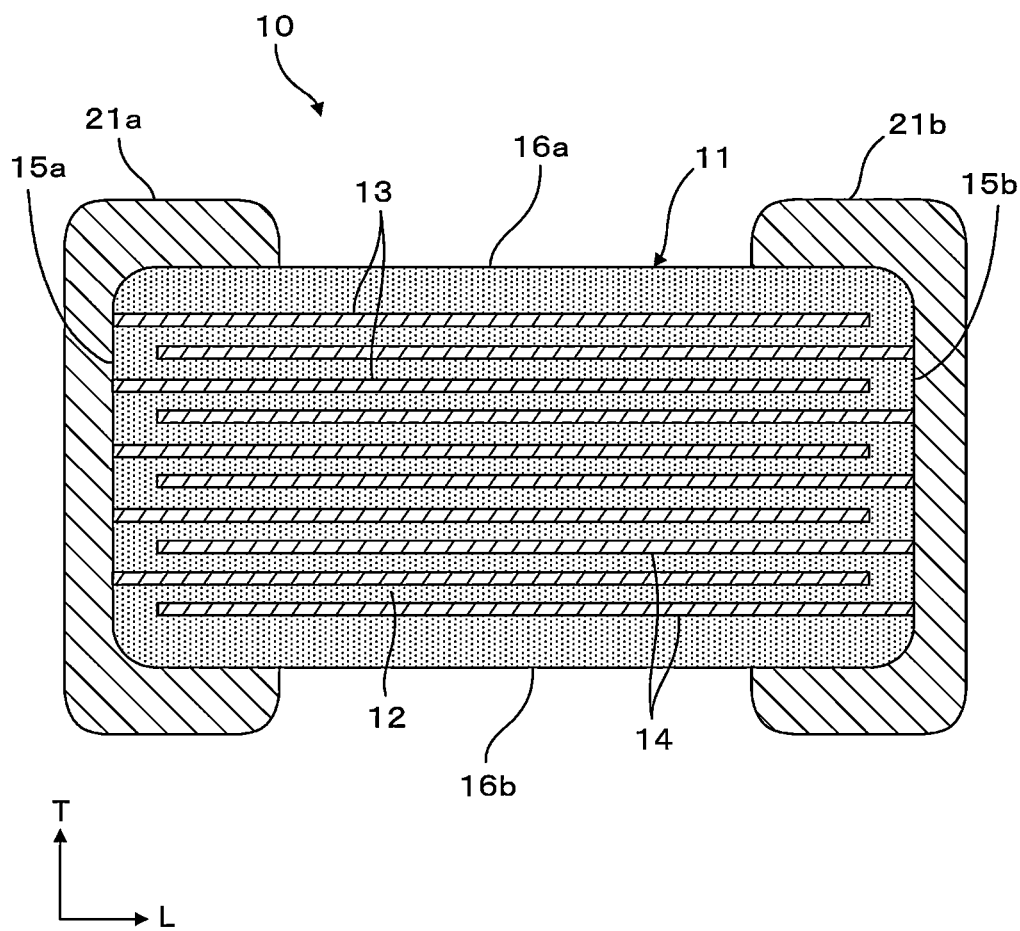
FIG. 2 is a cross-sectional view schematically illustrating the structure taken along a II-II line of the electronic component illustrated in FIG. 1.
Figure 3:
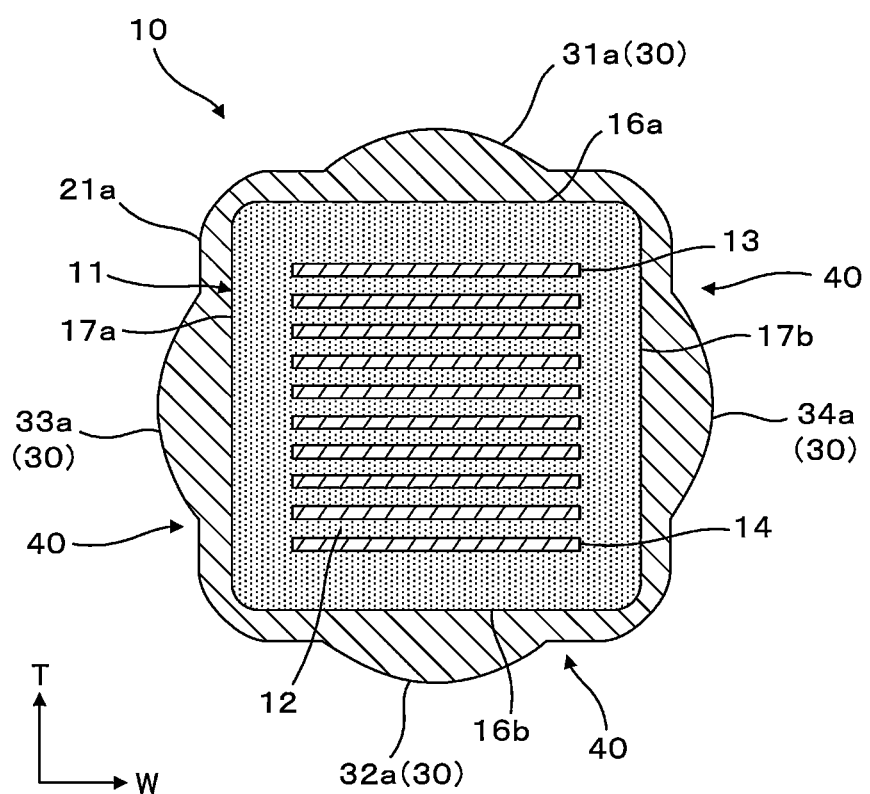
FIG. 3 is a cross-sectional view schematically illustrating the structure taken along a III-III line of the electronic component illustrated in FIG. 1.

FIG. 1 is a perspective view schematically illustrating an electronic component 10 according to a first preferred embodiment of the present invention. FIG. 2 is a cross-sectional view schematically illustrating the structure taken along a II-II line of the electronic component 10 illustrated in FIG. 1. FIG. 3 is a cross-sectional view schematically illustrating the structure taken along a III-III line of the electronic component 10 illustrated in FIG. 1.

The electronic component 10 according to the first preferred embodiment preferably includes a main body 11, a first outer electrode 21a, and a second outer electrode 21b. The first outer electrode 21a and the second outer electrode 21b are provided on the surface of the main body 11. The first outer electrode 21a and the second outer electrode 21b are opposed to each other, as illustrated in FIG. 1.

Here, the direction in which the first outer electrode 21a is opposed to the second outer electrode 21b is defined as a length direction L of the electronic component 10, the direction in which dielectric layers 12, first inner electrodes 13, and second inner electrodes 14 described below are laminated is defined as a thickness direction T thereof, and the direction orthogonal to or substantially orthogonal to the length direction L and the thickness direction T is defined as a width direction W thereof. Arbitrary two directions, among the length direction L, the thickness direction T, and the width direction W, are orthogonal to each other.

Although the length direction L has the largest dimension, among the respective dimensions of the length direction L, the width direction W, the thickness direction T of the electronic component 10, in the first preferred embodiment, the electronic component 10 may have a configuration in which the width direction W has the largest dimension.

The main body 11 includes a first end surface 15a and a second end surface 15b opposed to each other in the length direction L, a first main surface 16a and a second main surface 16b opposed to each other in the thickness direction T, and a first side surface 17a and a second side surface 17b opposed to each other in the width direction W. The main body 11 preferably has a rectangular or substantially rectangular parallelepiped shape. Corners and ridge lines of the main body 11 in the first preferred embodiment are preferably rounded and a shape of a rectangular parallelepiped having rounded corners and ridge lines is included in the substantially rectangular parallelepiped shape. The corners are portions where three surfaces of the main body 11 intersects with each other, and the ridge lines are portions where two surfaces of the main body 11 intersect with each other.

As illustrated in FIG. 2 and FIG. 3, the main body 11 includes multiple first inner electrodes 13 and multiple second inner electrodes 14, which are alternately laminated in the thickness direction T, and the dielectric layers 12 provided between the first inner electrodes 13 and the second inner electrodes 14. In other words, the main body 11 includes a structure in which the multiple first inner electrodes 13 and the multiple second inner electrodes 14 are alternately laminated in the thickness direction T with the dielectric layers 12 interposed therebetween.

The dielectric layers 12 are made of ceramic material preferably including, for example, $BaTiO_3$, $CaTiO_3$, $SrTiO_3$, $SrZrO_3$, or $CaZrO_3$ as a major component. An accessory component, such as, for example, Mn compound, Fe compound, Cr compound, Co compound, or Ni compound, the content of which is smaller than that of the major component, may be added to the major component.

The first inner electrodes 13 extend to the first end surface 15a of the main body 11 to be electrically connected to the first outer electrode 21a. The second inner electrodes 14 extend to the second end surface 15b of the main body 11 to be electrically connected to the second outer electrode 21b.

The main body 11 may include inner electrodes that are not exposed from the surface, in addition to the first inner electrodes 13 and the second inner electrodes 14.

The first inner electrodes 13 each include an opposing electrode portion opposed to the corresponding second inner electrode 14 and an extended electrode portion extending from the opposing electrode portion to the first end surface 15a of the main body 11. The second inner electrodes 14 each preferably include an opposing electrode portion opposed to the corresponding first inner electrode 13 and an extended electrode portion extending from the opposing electrode portion to the second end surface 15b of the main body 11.

The opposing electrode portion of the first inner electrode 13 is opposed to the opposing electrode portion of the second inner electrode 14 with the dielectric layer 12 interposed therebetween to provide capacitance, which defines and functions as a capacitor.

The first inner electrodes 13 and the second inner electrodes 14 include metal, such as, for example, Ni, Ag, Pd, Au, Cu, Ti, or Cr, or alloy or the like including the above metal as the major component. The first inner electrodes 13 and the second inner electrodes 14 may include the same ceramic material as the dielectric ceramics included in the dielectric layers 12 as common material. The content ratio of the common material in the first inner electrodes 13 is, for example, about 20 percent by volume or less of the entire first inner electrodes 13. The same applies to the content ratio of the common material in the second inner electrodes 14.

All of the multiple first inner electrodes 13 and the multiple second inner electrodes 14 are not necessarily made of the same material, and some of the multiple first inner electrodes 13 and the multiple second inner electrodes 14 may be made of different materials. A portion of one first inner electrode 13 and one second inner electrode 14 may be made of a different material.

The first outer electrode 21a is provided at one end side in the length direction L of the main body 11. Specifically, the first outer electrode 21a is provided over the first end surface 15a of the main body 11 and is provided to wrap around the first main surface 16a, the second main surface 16*b*, the first side surface 17*a*, and the second side surface 17*b* from the first end surface 15*a*.

The second outer electrode 21*b* is provided at the other end side in the length direction L of the main body 11. Specifically, the second outer electrode 21*b* is provided over the second end surface 15*b* of the main body 11 and is provided to wrap around the first main surface 16*a*, the second main surface 16*b*, the first side surface 17*a*, and the second side surface 17*b* from the second end surface 15*b*.

Each of the first outer electrode 21*a* and the second outer electrode 21*b* preferably includes a first protrusion 31 protruding in a direction orthogonal to or substantially orthogonal to the first main surface 16*a* of the main body 11, a second protrusion 32 protruding in a direction orthogonal to or substantially orthogonal to the second main surface 16*b* thereof, a third protrusion 33 protruding in a direction orthogonal to or substantially orthogonal to the first side surface 17*a* thereof, and a fourth protrusion 34 protruding in a direction orthogonal to or substantially orthogonal to the second side surface 17*b* thereof. The first protrusions 31 to the fourth protrusions 34 may be collectively referred to as protrusions 30 in the following description.

Specifically, the first outer electrode 21*a* includes a first protrusion 31*a* protruding in the direction orthogonal to or substantially orthogonal to the first main surface 16*a* of the main body 11, a second protrusion 32*a* protruding in the direction orthogonal to or substantially orthogonal to the second main surface 16*b* thereof, a third protrusion 33*a* protruding in the direction orthogonal to or substantially orthogonal to the first side surface 17*a* thereof, and a fourth protrusion 34*a* protruding in the direction orthogonal to or substantially orthogonal to the second side surface 17*b* thereof, as illustrated in FIG. 3. In the first preferred embodiment, the first protrusion 31*a* and the second protrusion 32*a* are positioned at the center or approximate center in the width direction W of the first outer electrode 21*a*. The third protrusion 33*a* and the fourth protrusion 34*a* are positioned at the center or approximate center in the thickness direction T of the first outer electrode 21*a*.

The second outer electrode 21*b* includes a first protrusion 31*b* protruding in the direction orthogonal to or substantially orthogonal to the first main surface 16*a* of the main body 11, a second protrusion 32*b* protruding in the direction orthogonal to or substantially orthogonal to the second main surface 16*b* thereof, a third protrusion 33*b* protruding in the direction orthogonal to or substantially orthogonal to the first side surface 17*a* thereof, and a fourth protrusion 34*b* protruding in the direction orthogonal to or substantially orthogonal to the second side surface 17*b* thereof. In the first preferred embodiment, the first protrusion 31*b* and the second protrusion 32*b* are positioned at the center or approximate enter in the width direction W of the second outer electrode 21*b*. The third protrusion 33*b* and the fourth protrusion 34*b* are positioned at the center or approximate center in the thickness direction T of the second outer electrode 21*b*.

As illustrated in FIG. 1, the protrusions 30 of the first outer electrode 21*a* and the second outer electrode 21*b* extend in the length direction L. In other words, the first protrusions 31 have the same or substantially the same shape when each of the first outer electrode 21*a* and the second outer electrode 21*b* are cut off at an arbitrary position along a plane parallel to or substantially parallel to the first end surface 15*a* and the second end surface 15*b* of the main body 11. The same applies to the second protrusions 32, the third protrusions 33, and the fourth protrusions 34.

Although some of the ridge lines of the first outer electrode 21*a* and the second outer electrode 21*b* are shown as right angles in FIG. 1, a portion of the ridge lines of the first outer electrode 21*a* and the second outer electrode 21*b*, which appear to be at right angles in FIG. 1, is rounded, as in the main body 11. Although some of the protrusions 30 and depressions 40 described below are show as right angles, a portion of the protrusions 30 and the depressions 40 may be rounded.

Figure 11:
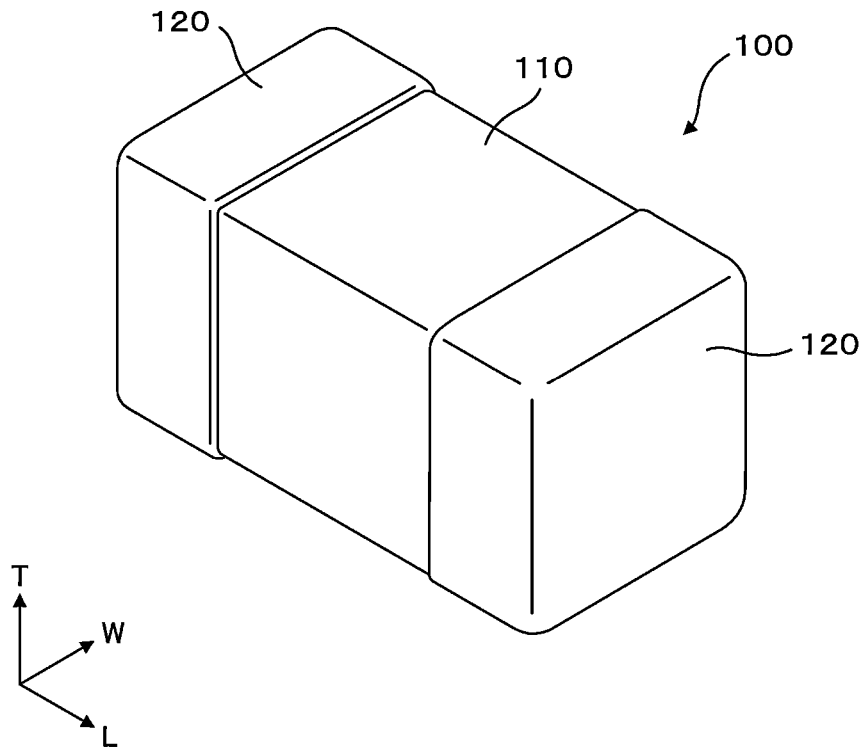
FIG. 11 is a perspective view schematically illustrating an electronic component in the related art having outer electrodes with no protrusion.

In the electronic component 100 in the related art illustrated in FIG. 11, the outer electrodes 120 have shapes matched with the substantially rectangular parallelepiped shape of the main body 110. In other words, the surface of the outer electrodes 120 is flat, similar to the surface of the main body 110.

Figure 4:
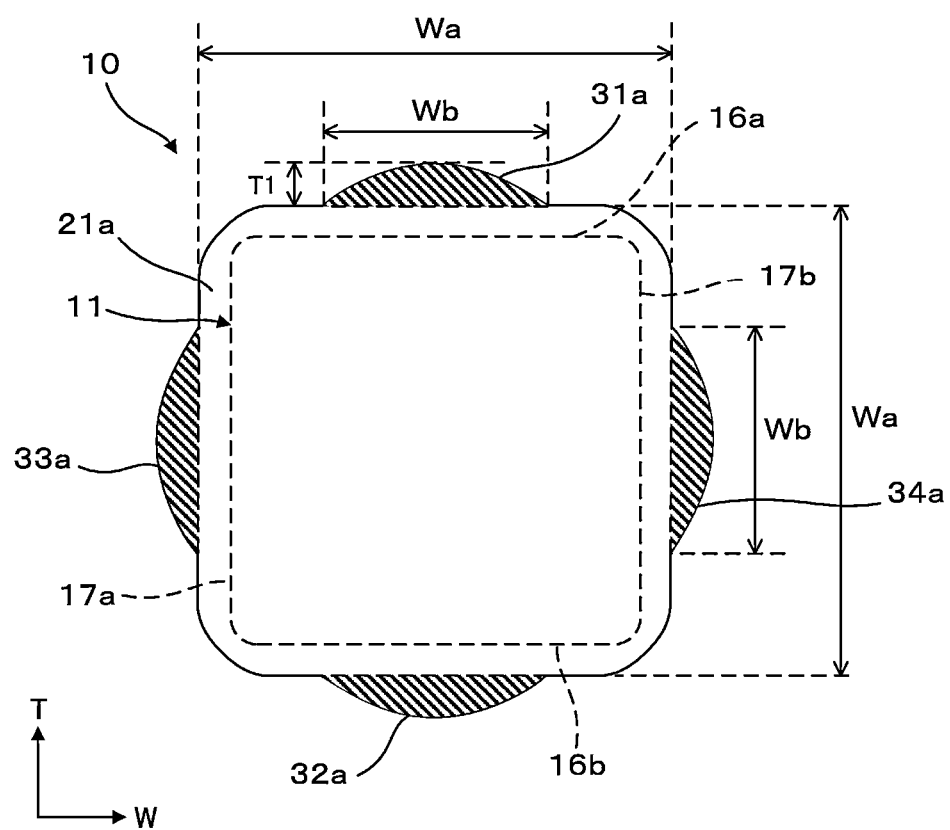
FIG. 4 is a plan view when the electronic component according to the first preferred embodiment of the present invention is viewed in a length direction from a first outer electrode side.

In contrast, in the electronic component 10 according to the first preferred embodiment, the surface of the first outer electrode 21*a* is not flat but includes the portions protruding outward, as illustrated in FIG. 4. FIG. 4 is a plan view when the electronic component 10 is viewed in the length direction L from the first outer electrode 21*a* side. The first protrusion 31*a*, the second protrusion 32*a*, the third protrusion 33*a*, and the fourth protrusion 34*a* of the first outer electrode 21*a* are hatched in FIG. 4. Similarly, the surface of the second outer electrode 21*b* is not flat but includes the portions protruding outward. In other words, the first protrusion 31*a* to the fourth protrusion 34*a* of the first outer electrode 21*a* and the first protrusion 31*b* to the fourth protrusion 34*b* of the second outer electrode 21*b* mean the portions protruding outward with respect to the planar or substantially planar surface.

In the electronic component 10 according to the first preferred embodiment, the presence of the first protrusion 31*a* to the fourth protrusion 34*a* of the first outer electrode 21*a* causes the depressions 40 in the first outer electrode 21*a*, as illustrated in FIG. 3. Specifically, the depressions 40 are provided on both sides of each of the first protrusion 31*a* to the fourth protrusion 34*a*. Similarly, the presence of the first protrusion 31*b* to the fourth protrusion 34*b* of the second outer electrode 21*b* causes the depressions 40 in the second outer electrode 21*b*.

In the first preferred embodiment, the respective surfaces of the first protrusion 31*a*, the second protrusion 32*a*, the third protrusion 33*a*, and the fourth protrusion 34*a* have arc shapes on a cross section when the first outer electrode 21*a* is cut off along the plane parallel or substantially parallel to the first end surface 15*a* and the second end surface 15*b*, as illustrated in FIG. 3. In other words, the first protrusion 31*a*, the second protrusion 32*a*, the third protrusion 33*a*, and the fourth protrusion 34*a* of the first outer electrode 21*a* do not have planar surfaces but have curved surfaces.

Similarly, the respective surfaces of the first protrusion 31*b*, the second protrusion 32*b*, the third protrusion 33*b*, and the fourth protrusion 34*b* have arc shapes on a cross section when the second outer electrode 21*b* is cut off along the plane parallel or substantially parallel to the first end surface 15*a* and the second end surface 15*b*. In other words, the first protrusion 31*b*, the second protrusion 32*b*, the third protrusion 33*b*, and the fourth protrusion 34*b* of the second outer electrode 21*b* do not have planar surfaces but have curved surfaces.

In the first preferred embodiment, all of the protrusions 30 of the first protrusion 31*a* to the fourth protrusion 34*a* of the first outer electrode 21*a* and the first protrusion 31*b* to the fourth protrusion 34*b* of the second outer electrode 21*b* have the same or substantially the same shape and the same or substantially the same size. However, it is not necessary for all of the protrusions 30 to have completely the same shape and size and at least one of all of the protrusions 30 may differ from the remaining protrusions 30 in at least one of the shape and the size. In other words, in the electronic component 10 according to the first preferred embodiment, it is sufficient for at least one of the first protrusion 31, the second protrusion 32, the third protrusion 33, and the fourth protrusion 34 to have an arch shape on a cross section when each of the first outer electrode 21a and the second outer electrode 21b is cut off along the plane parallel or substantially parallel to the first end surface 15a and the second end surface 15b.

Figure 5:
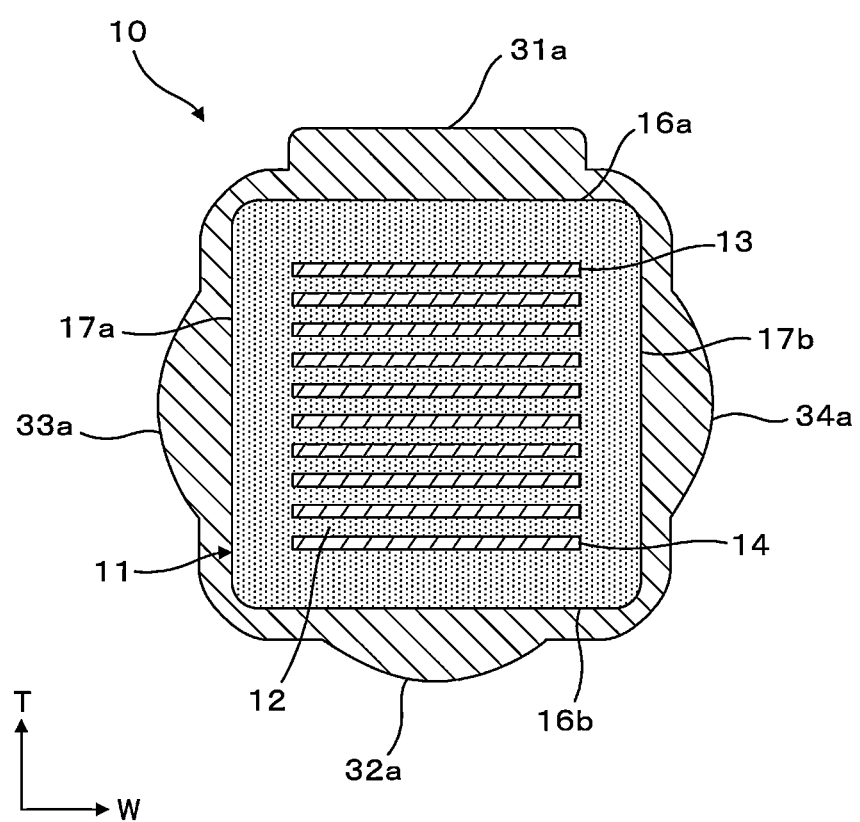
FIG. 5 is a cross-sectional view schematically illustrating the structure of the electronic component in which only a first protrusion has a different shape, among four protrusions of the first outer electrode in the electronic component illustrated in FIG. 3.

FIG. 5 is a cross-sectional view schematically illustrating the structure of the electronic component 10 in which only the first protrusion 31a has a different shape, among the four protrusions: the first protrusion 31a to the fourth protrusion 34a of the first outer electrode 21a. The cut-off position of the cross-sectional view illustrated in FIG. 5 is the same or substantially the same as that of the cross-sectional view illustrated in FIG. 3. In the example illustrated in FIG. 5, the first protrusion 31a has a rectangular or substantially rectangular shape on the cross section when the first outer electrode 21a is cut off along the plane parallel or substantially parallel to the first end surface 15a and the second end surface 15b. A rectangular shape in which at least a portion of the corners is rounded is included in the "substantially rectangular shape."

The first protrusion 31a side, that is, the first main surface 16a side of the main body 11 having a substantially rectangular parallelepiped shape is capable of being identified because the shape of the first protrusion 31a is different from the shapes of the second protrusion 32a, the third protrusion 33a, and the fourth protrusion 34a. Accordingly, since the electronic component 10 is capable of being mounted on a substrate, for example, in an orientation in which the second main surface 16b of the main body 11 opposes the substrate and the first main surface 16a thereof opposes a side opposite to the substrate, it is possible to cause the laminating direction of the first inner electrodes 13 and the second inner electrodes 14 to coincide with the mounting direction.

Similar to the shape of the first protrusion 31a of the first outer electrode 21a, the shape of the first protrusion 31b of the second outer electrode 21b may be different from the shapes of the second protrusion 32b to the fourth protrusion 34b. The sizes of the first protrusion 31a and the first protrusion 31b may be different from the sizes of the remaining protrusions 30 while all the protrusions 30 have the same shape. In addition, in order to cause the laminating direction of the first inner electrodes 13 and the second inner electrodes 14 to coincide with the mounting direction, at least one of the shape and the size of the second protrusions 32 may be different from at least one of the shape and the size of the remaining protrusions 30.

The first outer electrode 21a and the second outer electrode 21b each preferably include, for example, a base electrode layer and a plating layer on the base electrode layer.

The base electrode layer preferably includes, for example, at least one of a baking electrode layer, a resin electrode layer, a thin-film electrode layer, and so on described below. In order to bring the coefficient of linear expansion of the first outer electrode 21a and the second outer electrode 21b closer to the coefficient of linear expansion of the dielectric layers 12, the base electrode layer may include, for example, glass or the common material made of the same material as the material contained in the dielectric layers 12 or material similar to the material contained in the dielectric layers 12. When the base electrode layer contains the common material or glass, the content ratio of the common material or glass is preferably, for example, higher than or equal to about 30 percent by volume of the entire outer electrodes and lower than or equal to about 70 percent by volume thereof.

The baking electrode layer includes glass and metal and one baking electrode layer or multiple baking electrode layers may be provided. The baking electrode layer preferably includes metal, such as, for example, Cu, Ni, Ag, Pd, Ti, Cr, or Au, or alloy or the like including the metal. The baking electrode layer is capable of being formed by, for example, dipping the main body in a paste tank in which conductive paste containing glass and metal is accumulated and, then, baking the main body.

The resin electrode layer is capable of being formed as, for example, a layer including conductive particles and thermosetting epoxy resin. In the formation of the resin electrode layer, the resin electrode layer may be formed directly on the main body without forming the baking electrode layer. One resin electrode layer or multiple resin electrode layers may be provided.

The thin-film electrode layer is preferably, for example, a layer of about one μm or less having metal particles deposited therein and is capable of being formed by a known thin-film formation method, such as sputtering or evaporation, for example.

The plating layer on the base electrode layer includes metal, such as, for example, Cu, Ni, Ag, Pd, Ti, Cr, or Au, or alloy including the metal as the major component. One plating layer or multiple plating layers may be provided. However, the plating layer preferably includes a two-layer structure of an Ni plating layer and an Sn plating layer. The Ni plating layer prevents the base electrode layer from being eroded by solder in the mounting of the electronic component 10. The Sn plating layer improves the wettability of the solder in the mounting of the electronic component 10.

Although the protrusions 30 of the first outer electrode 21a and the second outer electrode 21b are made of the same material as that of the portions other than the protrusions 30, the protrusions 30 of the first outer electrode 21a and the second outer electrode 21b may be made of material different from that of the portions other than the protrusions 30.

An example of the size of the electronic component 10 will now be described. The dimension in the length direction L of the electronic component 10 is preferably, for example, greater than or equal to about 0.7 mm and smaller than or equal to about 1.2 mm and is about 1.0 mm as an example. The dimension in the width direction W of the electronic component 10 is preferably, for example, greater than or equal to about 0.4 mm and smaller than or equal to about 0.6 mm and is about 0.5 mm as an example. The dimension in the thickness direction T of the electronic component 10 is preferably, for example, greater than or equal to about 0.4 mm and smaller than or equal to about 0.6 mm and is about 0.5 mm as an example. In other words, the dimension in the width direction 3 of the electronic component 10 is equal or substantially equal to the dimension in the thickness direction T thereof. However, the dimension in the width direction W of the electronic component 10 may be different from the dimension in the thickness direction T thereof.

In the main body 11, the dimension in the length direction L between the first outer electrode 21a and the second outer electrode 21b is preferably, for example, greater than or equal to about 0.4 mm and smaller than or equal to about 0.6 mm and is about 0.5 mm as an example. The dimension in the length direction L of the first outer electrode 21a and the second outer electrode 21b is preferably, for example, greater than or equal to about 0.05 mm and smaller than or equal to about 0.4 mm and is about 0.25 mm as an example.

The dimension in the thickness direction T of the dielectric layer 12 is preferably, for example, greater than or equal to about 0.001 mm and smaller than or equal to about 0.01 mm and is about 0.002 mm as an example. The dimension in the thickness direction T of the first inner electrode 13 and the second inner electrode 14 is preferably, for example, greater than or equal to about 0.001 mm and smaller than or equal to about 0.008 mm and is about 0.002 mm as an example. The dimension in the width direction W of the first inner electrode 13 and the second inner electrode 14 is preferably, for example, greater than or equal to about 0.18 mm and smaller than or equal to about 0.568 mm and is about 0.4 mm as an example.

The thickness of the first outer electrode 21a and the second outer electrode 21b is preferably, for example, greater than or equal to about 0.003 mm and smaller than or equal to about 0.05 mm and is about 0.01 mm as an example. A maximum thickness T1 (refer to FIG. 4), among the thicknesses of the first protrusions 31, the second protrusions 32, the third protrusions 33, and the fourth protrusions 34 of the first outer electrode 21a and the second outer electrode 21b, is preferably, for example, greater than or equal to about 0.003 mm and smaller than or equal to about 0.05 mm and is about 0.01 mm as an example.

As described above, each of the first outer electrode 21a and the second outer electrode 21b includes the first protrusion 31 protruding in the direction orthogonal to or substantially orthogonal to the first main surface 16a of the main body 11, the second protrusion 32 protruding in the direction orthogonal to or substantially orthogonal to the second main surface 16b thereof, the third protrusion 33 protruding in the direction orthogonal to or substantially orthogonal to the first side surface 17a thereof, and the fourth protrusion 34 protruding in the direction orthogonal to or substantially orthogonal to the second side surface 17b thereof. Accordingly, in conveyance of the electronic component 10 on a conveyance path, the protrusions 30 opposed to the conveyance path, among the first protrusions 31 to the fourth protrusion 34, are in contact with the conveyance path. Consequently, since the contact area between the first outer electrode 21a and the second outer electrode 21b and the conveyance path is decreased, compared with the configuration in the related art having the outer electrodes with no protrusion (refer to FIG. 11), frictional resistance against the conveyance path is also decreased.

In other words, with the electronic component 10 according to the first preferred embodiment, since the frictional resistance in the conveyance on the conveyance path is decreased, it is possible to reduce or prevent stay of the electronic component 10 on the conveyance path to enable smooth conveyance. Accordingly, it is possible to reduce the manufacturing time when the electronic component 10 is conveyed to the next step to manufacture an electronic device or the like.

In addition, since each of the first outer electrode 21a and the second outer electrode 21b includes the protrusions 30 protruding in the respective directions orthogonal or substantially orthogonal to the first main surface 16a, the second main surface 16b, the first side surface 17a, and the second side surface 17b of the main body 11, it is possible to decrease the contact area with the conveyance path to decrease the frictional resistance regardless of the surface opposed to the conveyance path, among the four surfaces including the main surfaces and the side surfaces of the main body 11.

In the electronic component 100 in the related art having the outer electrodes with no protrusion (FIG. 11), any crack or layer peeling off may occur in the electronic components 100 due to collision between the electronic components in the conveyance on the conveyance path. It is difficult to detect such an internal defect. In contrast, in the electronic component 10 according to the first preferred embodiment, the collision is likely to occur at the protrusions 30 of the first outer electrode 21a and the second outer electrode 21b, which protrude outward, in the collision between the electronic components 10. Accordingly, since the defects caused by, for example, cracking, chapping, or chipping, are likely to occur in the protrusions 30 of the first outer electrode 21a and the second outer electrode 21b, which are structurally weak, the defect is capable of being detected through appearance inspection of the protrusions 30. Consequently, it is easy to identify any defective including the structural defect to further reduce mixing of the defective into the electronic device.

Since the conveyance speed of the electronic component 10 is increased because of the decrease in the frictional resistance against the conveyance path in the electronic component 10 according to the first preferred embodiment, the damage at the collision is increased. However, since the defect occurring in the collision is easy to detect, as described above, it is possible to achieve both the increase in the conveyance speed of the electronic component 10 and the reduction of the mixing of the defective.

Since the first outer electrode 21a and the second outer electrode 21b include the protrusions 30 in the electronic component 10 according to the first preferred embodiment, the surface areas of the first outer electrode 21a and the second outer electrode 21b are increased, compared with the configuration in the related art with no protrusion 30. Accordingly, since the contact area between the first outer electrode 21a and the second outer electrode 21b and the solder is increased in the mounting of the electronic component 10 on the substrate with the solder, the bonding strength is increased to suppress the peeling of the electronic component 10 from the substrate.

When the electronic component 10 according to the first preferred embodiment, which is, for example, a multilayer ceramic capacitor, is mounted on the substrate, the distance between the main body 11 and the substrate is increased by the amount corresponding to the protrusion 30 because the first outer electrode 21a and the second outer electrode 21b have the protrusions 30. Accordingly, since vibration of the electronic component 10 is less likely to be transmitted to the substrate, an occurrence of noise, such as ringing, is capable of being reduced or prevented. In addition, since flexure starts to occur from the protrusions when the electronic component 10 mounted on the substrate is flexed, it is possible to reduce or prevent the occurrence of the noise, such as the ringing.

Low frictional resistance, surface crack, mounting strength, the degree of flexure, and protection of corners were confirmed while varying the dimensions in the width direction W of the first protrusion 31 and the second protrusion 32 and the dimensions in the thickness direction T of the third protrusion 33 and the fourth protrusion 34. The frictional resistance is the frictional resistance between the electronic component 10 and the conveyance path in the conveyance of the electronic component 10 on the conveyance path, as described above. The surface crack is checked based on whether any crack occurs on the surfaces due to the collision when the multiple electronic components 10 are conveyed on the conveyance path. The mounting strength is the strength when the electronic component 10 is mounted on the substrate. The degree of flexure indicates the degree of flexure when the electronic component 10 mounted on the substrate is flexed. The protection of corners is checked based on whether the corners of the electronic component 10 have shapes that are easily protected. The confirmation results are indicated in Table 1.

of the protrusions 30 is about Wa/8 or more. When the dimension Wb of the protrusions is small, the electronic components collide with each other at positions other than the protrusions 30 to easily cause the crack or the layer peeling off in the electronic components 10. In order to

TABLE 1

| | LOW FRICTIONAL RESISTANCE | SURFACE CRACK | MOUNTING STRENGTH | DEGREE OF FLEXURE | PROTECTION OF CORNERS |
|---|---|---|---|---|---|
| 0 < Wb < Wa/8 | ⊙ | — | ○ | ○ | — |
| Wa/8 ≤ Wb < Wa/4 | ⊙ | Δ | ○ | ○ | — |
| Wa/4 ≤ Wb < 3Wa/8 | ⊙ | ○ | ○ | ○ | — |
| 3Wa/8 ≤ Wb < Wa/2 | ⊙ | ⊙ | ⊙ | ○ | — |
| Wa/2 ≤ Wb < 5Wa/8 | ⊙ | ⊙ | ⊙ | ○ | Δ |
| 5Wa/8 ≤ Wb < 3Wa/4 | ⊙ | ⊙ | ⊙ | ○ | Δ |
| 3Wa/4 ≤ Wb < 7Wa/8 | ⊙ | ○ | ⊙ | ○ | ○ |
| 7Wa/8 ≤ Wb < Wa | ⊙ | ○ | ○ | ○ | ⊙ |

In Table 1, Wa denotes the dimension in the width direction W of the electronic component 10 excluding the protrusions 30 and Wb denotes the dimension in the width direction W of the first protrusion 31 and the second protrusion 32 and the dimension in the thickness direction T of the third protrusion 33 and the fourth protrusion 34 (FIG. 4). The dimensions in the width direction W of the electronic component 10 are equal or substantially equal to the dimensions in the thickness direction T thereof in the first preferred embodiment. The dimension Wb of the electronic component 10 is smaller than the dimension Wa thereof. Referring to Table 1, "-" is indicated when the evaluations of the low frictional resistance, the surface crack, the mounting strength, the degree of flexure, and the protection of corners of the electronic component 10 are equal to those of the electronic component 100 in the related art illustrated in FIG. 11, "Δ" is indicated when the evaluations of the low frictional resistance, the surface crack, the mounting strength, the degree of flexure, and the protection of corners of the electronic component 10 are slightly better than those of the electronic component 100 in the related art illustrated in FIG. 11, "○" is indicated when the evaluations of the low frictional resistance, the surface crack, the mounting strength, the degree of flexure, and the protection of corners of the electronic component 10 are better than those of the electronic component 100 in the related art illustrated in FIG. 11, and "⊙" is indicated when the =evaluations of the low frictional resistance, the surface crack, the mounting strength, the degree of flexure, and the protection of corners of the electronic component 10 are much better than those of the electronic component 100 in the related art illustrated in FIG. 11. The dimension Wb was varied to the following (1) to (8) for evaluation:
  (1) 0<Wb<Wa/8;
  (2) Wa/8≤Wb<Wa/4;
  (3) Wa/4≤Wb<3Wa/8;
  (4) 3Wa/8≤Wb<Wa/2;
  (5) Wa/2≤Wb<5Wa/8;
  (6) 5Wa/8≤Wb<3Wa/4;
  (7) 3Wa/4≤Wb<7Wa/8; and
  (8) 7Wa/8≤Wb<Wa As indicated in Table 1, in the electronic component 10 according to the first preferred embodiment, the frictional resistance was considerably decreased, compared with the electronic component in the related art, regardless of the setting of the dimension Wb of the protrusions 30.

The surface crack obtained results better than those of the electronic component in the related art if the dimension Wb of the protrusions 30 is about Wa/8 or more. When the dimension Wb of the protrusions is small, the electronic components collide with each other at positions other than the protrusions 30 to easily cause the crack or the layer peeling off in the electronic components 10. In order to cause the crack to be more likely to occur on the surface due to the collision, the dimension Wb of the protrusions 30 is preferably Wa/4≤Wb<Wa and is more preferably 3Wa/8≤Wb<3Wa/4, as indicated in Table 1.

In the electronic component 10 according to the first preferred embodiment, the mounting strength was improved, compared with the electronic component in the related art, regardless of the setting of the dimension Wb of the protrusions 30. As indicated in Table 1, in order to further improve the mounting strength, the dimension Wb of the protrusions 30 is preferably 3Wa/8≤Wb<7Wa/8.

In the electronic component 10 according to the first preferred embodiment, the degree of flexure was increased, compared with the electronic component in the related art, regardless of the setting of the dimension Wb of the protrusions 30. The degree of flexure is determined by the maximum thickness T1 of the protrusions 30 described above (refer to FIG. 4) and is increased with the increasing maximum thickness T1.

In the electronic component 10 according to the first preferred embodiment, the effect of protecting the corners of the first outer electrode 21a and the second outer electrode 21b attained results better than those of the electronic component in the related art if the dimension Wb of the protrusions 30 is Wa/2 or more. In other words, it is difficult to protect the corners of the first outer electrode 21a and the second outer electrode 21b if the dimension Wb of the protrusions 30 is small while it is easy to protect the corners of the first outer electrode 21a and the second outer electrode 21b owing to the protrusions 30 protruding outward if the dimension Wb of the protrusions 30 is large. As indicated in Table 1, in order to improve the effect of protecting the corners, the dimension Wb of the protrusions 30 is preferably 3Wa/4≤Wb<Wa and is more preferably 7Wa/8≤Wb<Wa.

Manufacturing Method

An example embodiment of a method of manufacturing the electronic component 10 described above will now be described.

First, a ceramic green sheet and inner electrode conductive paste are prepared. A known ceramic green sheet and known inner electrode conductive paste each including organic binder and organic solvent are available.

Next, the ceramic green sheet is printed with the inner electrode conductive paste to form an inner electrode pattern. For example, a printing method, such as screen printing or gravure printing, is used for the printing with the inner electrode conductive paste.

Next, ceramic green sheets of a certain number, including no inner electrode pattern formed thereon, are laminated, ceramic green sheets including the internal electrode pattern formed thereon are sequentially laminated on the ceramic green sheets having no inner electrode pattern formed thereon, and ceramic green sheets of a certain number, having no inner electrode pattern formed thereon, are laminated on the ceramic green sheets including the internal electrode pattern formed thereon to manufacture a mother multilayer body.

Next, the mother multilayer body is pressed in the laminating direction using rigid body press, isostatic press, or the like, for example, and, then, is cut into a certain size using a cutting method, such as, for example, a push cutting method, a cutting method with a dicing machine, or a laser cutting method, to form a ceramic body. The corners and/or the ridge lines of the ceramic body may be rounded using, for example, barrel polishing.

Next, the ceramic body is fired to form the protrusions at the positions where the first protrusions 31 to the fourth protrusions 34 are to be formed, on the surface of the fired ceramic body, using outer electrode conductive paste. Known outer electrode conductive paste is available. The formation of the protrusions is performed using, for example, a dispenser.

Next, the outer electrode conductive paste is applied to both end surfaces of the ceramic body, a portion of both main surfaces thereof, and a portion of both side surfaces thereof. The application of the outer electrode conductive paste is performed using, for example, a dipping method.

Next, after the outer electrode conductive paste is baked on the ceramic body, the plating layer is formed, if needed.

The electronic component 10 is capable of being manufactured through the above process. However, the method of manufacturing the electronic component 10 is not limited to the above one and the electronic component 10 may be manufactured using another manufacturing method.

Second Preferred Embodiment

Figure 6:
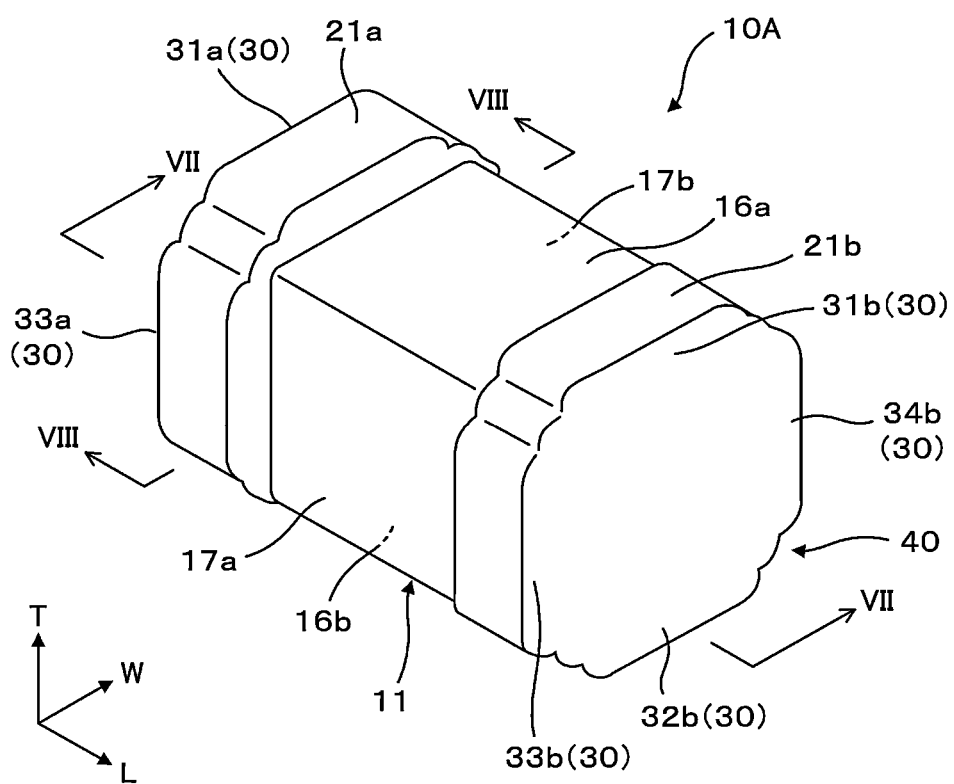
FIG. 6 is a perspective view schematically illustrating an electronic component according to a second preferred embodiment of the present invention.
Figure 7:
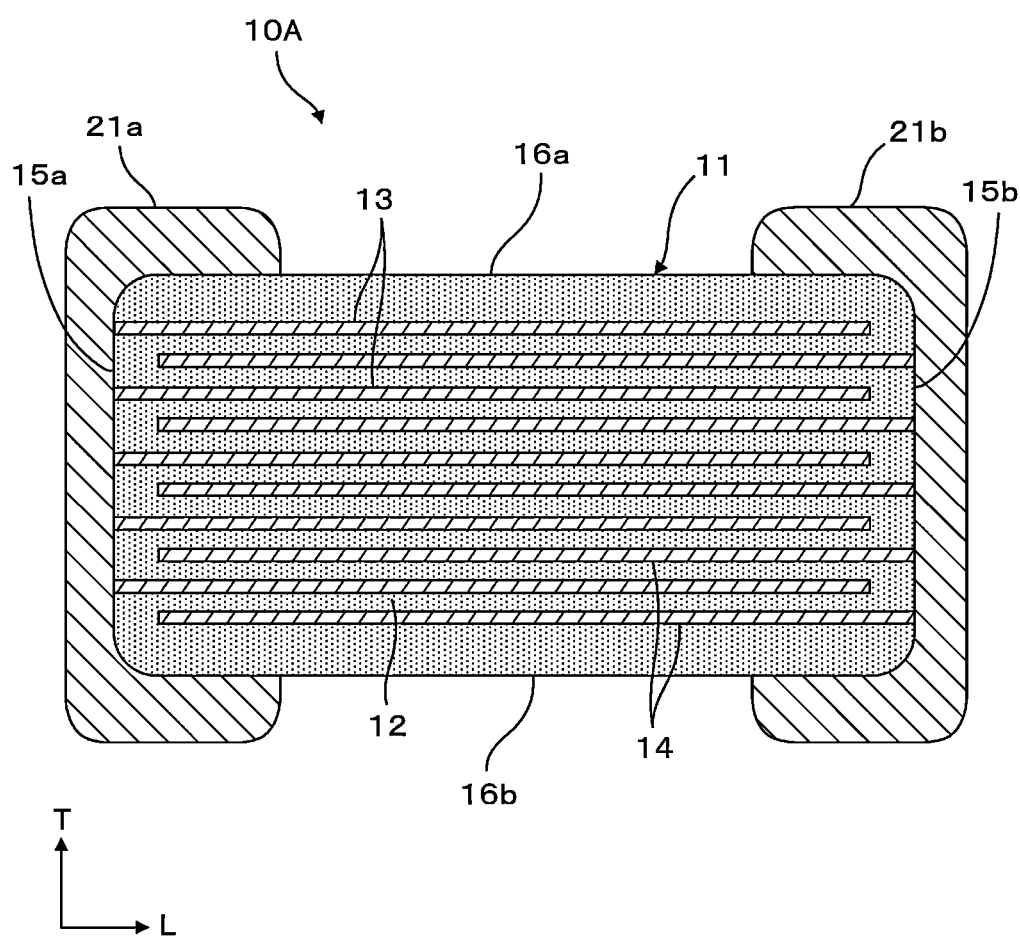
FIG. 7 is a cross-sectional view schematically illustrating the structure taken along a VII-VII line of the electronic component illustrated in FIG. 6.
Figure 8:
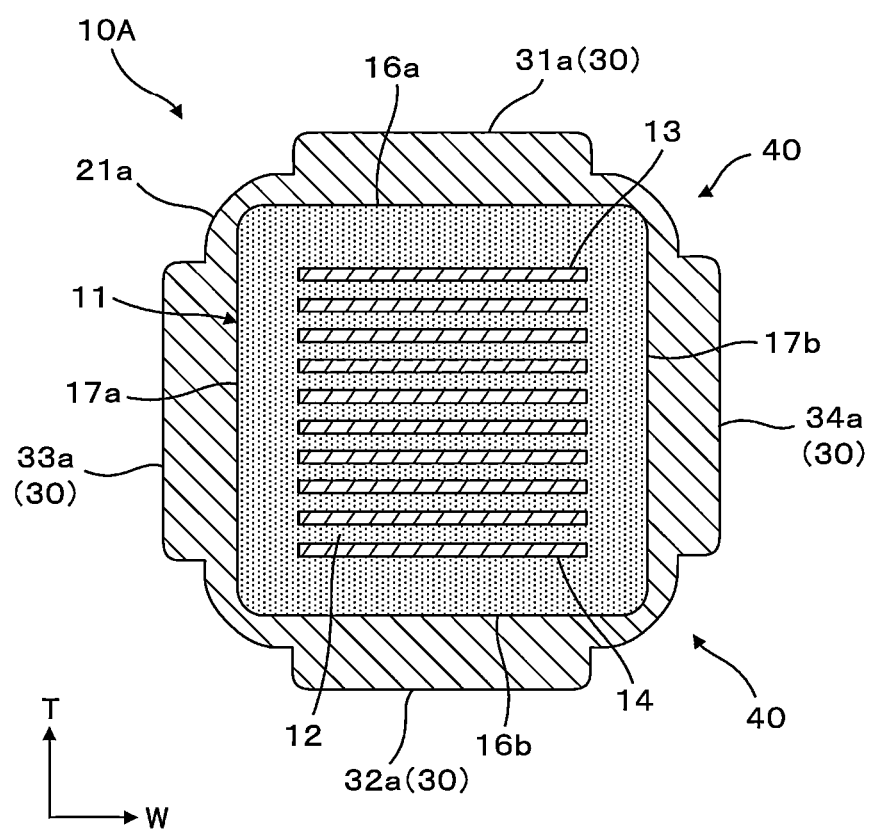
FIG. 8 is a cross-sectional view schematically illustrating the structure taken along a VIII-VIII line of the electronic component illustrated in FIG. 6.

FIG. 6 is a perspective view schematically illustrating an electronic component 10A according to a second preferred embodiment of the present invention. FIG. 7 is a cross-sectional view schematically illustrating the structure taken along a VII-VII line of the electronic component 10A illustrated in FIG. 6. FIG. 8 is a cross-sectional view schematically illustrating the structure taken along a VIII-VIII line of the electronic component 10A illustrated in FIG. 6.

The electronic component 10A according to the second preferred embodiment differs from the electronic component 10 according to the first preferred embodiment in the shapes of the first protrusion 31a to the fourth protrusion 34a of the first outer electrode 21a and the first protrusion 31b to the fourth protrusion 34b of the second outer electrode 21b.

As illustrated in FIG. 8, the first protrusion 31a, the second protrusion 32a, the third protrusion 33a, and the fourth protrusion 34a respectively have rectangular or substantially rectangular shapes on the cross section when the first outer electrode 21a is cut off along the plane parallel or substantially parallel to the first end surface 15a and the second end surface 15b. A rectangular shape in which at least part of the corners is rounded is included in the "substantially rectangular shape", as illustrated in FIG. 8.

Similarly, the first protrusion 31b, the second protrusion 32b, the third protrusion 33b, and the fourth protrusion 34b respectively have rectangular or substantially rectangular shapes on the cross section when the second outer electrode 21b is cut off along the plane parallel or substantially parallel to the first end surface 15a and the second end surface 15b.

Also in the electronic component 10A according to the second preferred embodiment, the presence of the first protrusion 31a to the fourth protrusion 34a of the first outer electrode 21a causes the depressions 40 in the first outer electrode 21a, as illustrated in FIG. 8. More specifically, the depressions 40 depressed inward with respect to the first protrusion 31a to the fourth protrusion 34a exist in the ridge line between the first protrusion 31a and the fourth protrusion 34a, the ridge line between the fourth protrusion 34a and the second protrusion 32a, the ridge line between the second protrusion 32a and the third protrusion 33a, and the ridge line between the third protrusion 33a and the first protrusion 31a.

Similarly, the presence of the first protrusion 31b to the fourth protrusion 34b of the second outer electrode 21b causes the depressions 40 in the second outer electrode 21b. More specifically, the depressions 40 depressed inward with respect to the first protrusion 31b to the fourth protrusion 34b exist in the ridge line between the first protrusion 31b and the fourth protrusion 34b, the ridge line between the fourth protrusion 34b and the second protrusion 32b, the ridge line between the second protrusion 32b and the third protrusion 33b, and the ridge line between the third protrusion 33b and the first protrusion 31b.

Also in the electronic component 10A according to the second preferred embodiment, it is not necessary for all of the protrusions 30 of the first protrusion 31a to the fourth protrusion 34a of the first outer electrode 21a and the first protrusion 31b to the fourth protrusion 34b of the second outer electrode 21b to have completely the same shape and size. Specifically, at least one of all of the protrusions 30 may differ from the remaining protrusions 30 in at least one of the shape and the size. Accordingly, in the electronic component 10A according to the second preferred embodiment, it is sufficient for at least one of the first protrusion 31, the second protrusion 32, the third protrusion 33, and the fourth protrusion 34 to have a substantially rectangular shape on the cross section when each of the first outer electrode 21a and the second outer electrode 21b is cut off along the plane parallel to the first end surface 15a and the second end surface 15b.

Since the first outer electrode 21a includes the first protrusion 31a to the fourth protrusion 34a and the second outer electrode 21b includes the first protrusion 31b to the fourth protrusion 34b also in the electronic component 10A according to the second preferred embodiment, as in the electronic component 10 according to the first preferred embodiment, the same or substantially the same advantageous effects as those of the electronic component 10 according to the first preferred embodiment are achieved.

Figure 9:
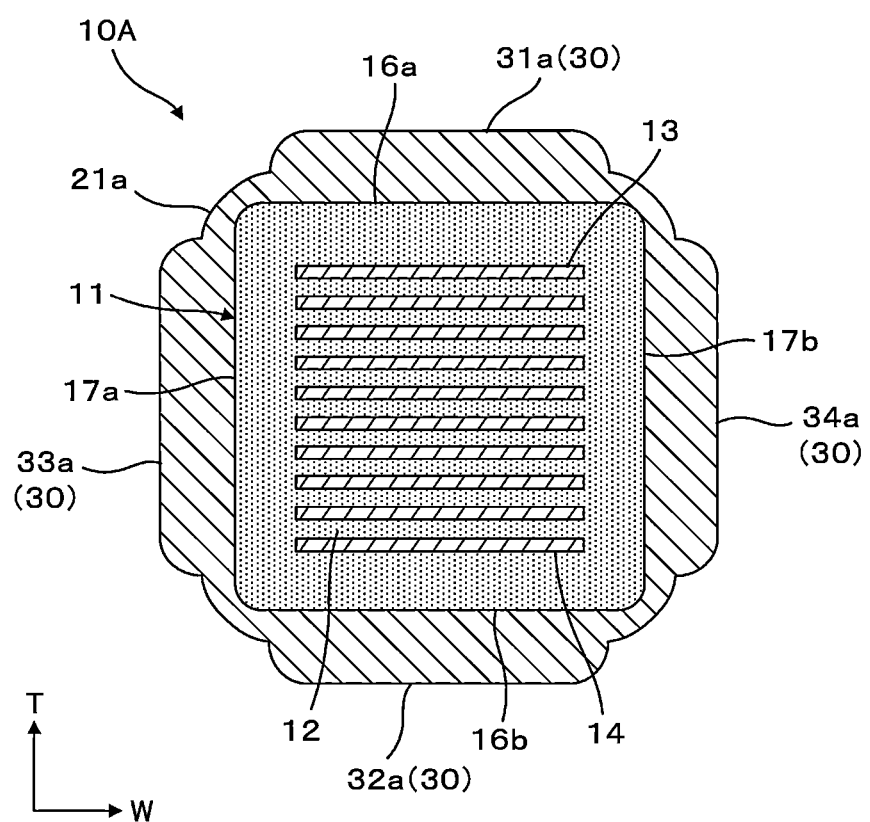
FIG. 9 is a cross-sectional view schematically illustrating an example of a modification of the structure of the electronic component according to the second preferred embodiment of the present invention.

The shapes of the first protrusions 31 to the fourth protrusions 34 are not limited to the ones illustrated in FIG. 6 to FIG. 8. For example, as illustrated in FIG. 9, the straight portions of the rectangular first protrusion 31a to the rectangular fourth protrusion 34a of the first outer electrode 21a may be further lengthened, compared with the structure illustrated in FIG. 8, or the corners of the rectangular shapes of the protrusions 30 may be further rounded. The same applies to the shapes of the first protrusion 31b to the fourth protrusion 34b of the second outer electrode 21b.

In the electronic component 100 in the related art including the outer electrodes 120 with no protrusion, illustrated in FIG. 11, since the ridge lines and the corners of the outer electrodes 120 are thinner than the remaining portions, the main body is likely to be exposed due to abrasion or the like caused by the collision or the like. However, in the electronic component 10A according to the second preferred embodiment, since the ridge lines and the corners of the first outer electrode 21a and the second outer electrode 21b are less likely to collide with other electronic components and so on because the ridge lines and the corners have the shapes depressed inward, it is possible to reduce or prevent the exposure of the main body 11 due to the abrasion or the like. In particular, in the second preferred embodiment, since the protrusions 30 have the rectangular or substantially rectangular shapes on the cross section, as described above, the ridge lines and the corners are easily protected by the protrusions 30, compared with the electronic component 10 according to the first preferred embodiment in which the surfaces of the protrusions 30 have the arc shapes. Accordingly, in the electronic component 10A according to the second preferred embodiment, it is possible to reduce or prevent the abrasion of the ridge lines and the corners of the first outer electrode 21a and the second outer electrode 21b, compared with the electronic component 10 according to the first preferred embodiment.

Also in the electronic component 10A according to the second preferred embodiment, the low frictional resistance, the surface crack, the mounting strength, the degree of flexure, and the protection of corners were confirmed while varying the dimension Wb in the width direction W of the first protrusion 31 and the second protrusion 32 and the dimension Wb in the thickness direction T of the third protrusion 33 and the fourth protrusion 34, as in the electronic component 10 according to the first preferred embodiment. The confirmation results are indicated in Table 2.

Figure 10:
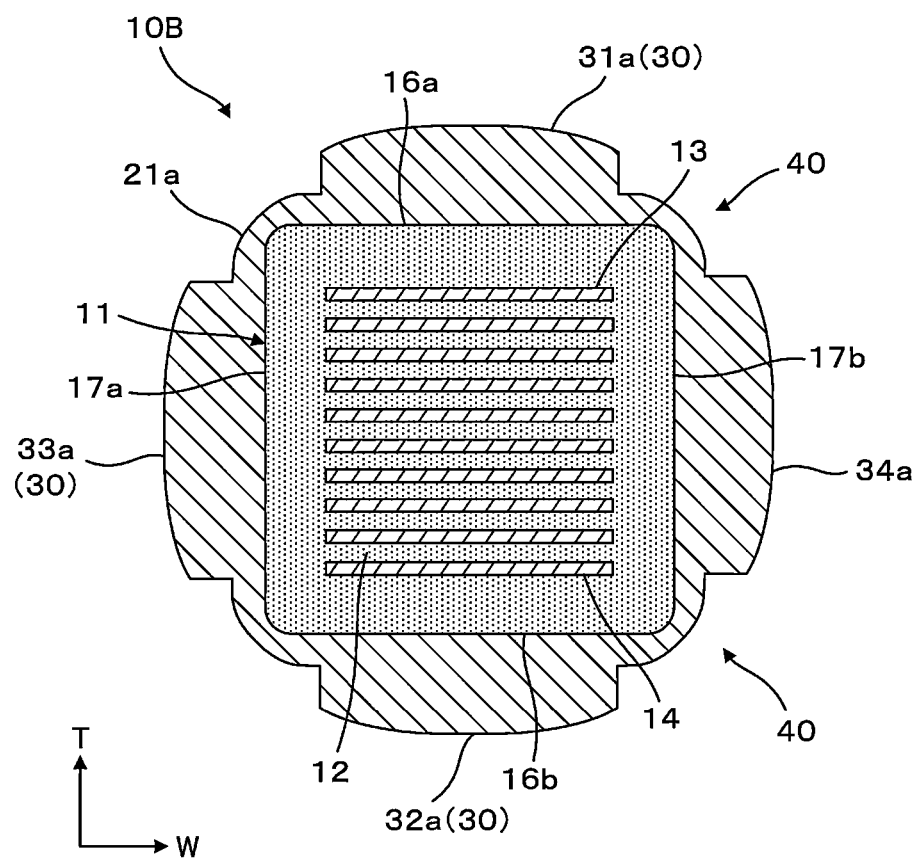
FIG. 10 is a cross-sectional view schematically illustrating the structure when an electronic component according to a third preferred embodiment of the present invention is cut off at the same position as that of the cross-sectional view illustrated in FIG. 3.

Also in the electronic component 10B according to the third preferred embodiment, the respective surfaces of the first protrusion 31a, the second protrusion 32a, the third protrusion 33a, and the fourth protrusion 34a have arc shapes, as illustrated in FIG. 10, on the cross section when the first outer electrode 21a is cut off along the plane parallel to the first end surface 15a and the second end surface 15b, as in the electronic component 10 according to the first preferred embodiment. Specifically, the first protrusion 31a, the second protrusion 32a, the third protrusion 33a, and the fourth protrusion 34a respectively have rectangular or substantially rectangular shapes and have the surfaces of arc shapes at the opposite side of the main body 11, on the cross section when the first outer electrode 21a is cut off along the plane parallel or substantially parallel to the first end surface 15a and the second end surface 15b.

Similarly, the respective surfaces of the first protrusion 31b, the second protrusion 32b, the third protrusion 33b, and the fourth protrusion 34b have arc shapes on the cross section when the second outer electrode 21b is cut off along the plane parallel or substantially parallel to the first end surface 15a and the second end surface 15b. Specifically, the first protrusion 31b, the second protrusion 32b, the third protrusion 33b, and the fourth protrusion 34b respectively have rectangular or substantially rectangular shapes and have the surfaces of arc shapes at the opposite side of the main body 11, on the cross section when the second outer electrode 21b is cut off along the plane parallel or substantially parallel to the first end surface 15a and the second end surface 15b.

Also in the electronic component 10B according to the third preferred embodiment, the presence of the first pro-

TABLE 2

| | LOW FRICTIONAL RESISTANCE | SURFACE CRACK | MOUNTING STRENGTH | DEGREE OF FLEXURE | PROTECTION OF CORNERS |
| --- | --- | --- | --- | --- | --- |
| 0 < Wb < Wa/8 | ⊙ | — | ○ | ○ | — |
| Wa/8 ≤ Wb < Wa/4 | ⊙ | △ | ○ | ○ | — |
| Wa/4 ≤ Wb < 3Wa/8 | ⊙ | ○ | ○ | ○ | — |
| 3Wa/8 ≤ Wb < Wa/2 | ⊙ | ⊙ | ⊙ | ○ | — |
| Wa/2 ≤ Wb < 5Wa/8 | ⊙ | ⊙ | ⊙ | ○ | △ |
| 5Wa/8 ≤ Wb < 3Wa/4 | ○ | ⊙ | ⊙ | ○ | △ |
| 3Wa/4 ≤ Wb < 7Wa/8 | △ | ○ | ⊙ | ○ | ○ |
| 7Wa/8 ≤ Wb < Wa | △ | ○ | ○ | ○ | ⊙ |

Since the results in Table 2 are the same or substantially the same as those in Table 1 except the result of the low frictional resistance, only the low frictional resistance will be described here. Since the contact area with the conveyance path is increased with the increasing dimension Wb of the protrusions 30 in the electronic component 10A according to the second preferred embodiment, the frictional resistance is increased. Accordingly, in order to decrease the frictional resistance, the dimension Wb of the protrusions is preferably smaller than 7Wa/8, is more preferably smaller than 3Wa/4, and is further preferably smaller than 5Wa/8, as indicated in Table 2.

Third Preferred Embodiment

FIG. 10 is a cross-sectional view schematically illustrating the structure of an electronic component 10B according to a third preferred embodiment of the present invention. The cut-off position of the cross-sectional view illustrated in FIG. 10 is the same or substantially the same as that of the cross-sectional view illustrated in FIG. 3.

trusion 31a to the fourth protrusion 34a of the first outer electrode 21a causes the depressions 40 in the first outer electrode 21a, as illustrated in FIG. 10. More specifically, the depressions 40 depressed inward with respect to the first protrusion 31a to the fourth protrusion 34a exist in the ridge line between the first protrusion 31a and the fourth protrusion 34a, the ridge line between the fourth protrusion 34a and the second protrusion 32a, the ridge line between the second protrusion 32a and the third protrusion 33a, and the ridge line between the third protrusion 33a and the first protrusion 31a.

Similarly, the presence of the first protrusion 31b to the fourth protrusion 34b of the second outer electrode 21b causes the depressions 40 in the second outer electrode 21b. More specifically, the depressions 40 depressed inward with respect to the first protrusion 31b to the fourth protrusion 34b exist in the ridge line between the first protrusion 31b and the fourth protrusion 34b, the ridge line between the fourth protrusion 34b and the second protrusion 32b, the ridge line between the second protrusion 32b and the third protrusion 33b, and the ridge line between the third protrusion 33b and the first protrusion 31b.

Also in the electronic component 10B according to the third preferred embodiment, it is not necessary for all of the protrusions 30 of the first protrusion 31a to the fourth protrusion 34a of the first outer electrode 21a and the first protrusion 31b to the fourth protrusion 34b of the second outer electrode 21b to have completely the same shape and size. Specifically, at least one of all of the protrusions 30 may differ from the remaining protrusions 30 in at least one of the shape and the size. Accordingly, in the electronic component 10B according to the third preferred embodiment, it is sufficient for at least one of the first protrusion 31, the second protrusion 32, the third protrusion 33, and the fourth protrusion 34 to have a rectangular or substantially rectangular shape and to have the surface of an arc shape at the opposite side of the main body 11, on the cross section when each of the first outer electrode 21a and the second outer electrode 21b is cut off along the plane parallel or substantially parallel to the first end surface 15a and the second end surface 15b.

Since the first outer electrode 21a includes the first protrusion 31a to the fourth protrusion 34a and the second outer electrode 21b includes the first protrusion 31b to the fourth protrusion 34b also in the electronic component 10B according to the third preferred embodiment, as in the electronic component 10 according to the first preferred embodiment, the same or substantially the same advantageous effects as those of the electronic component 10 according to the t first preferred embodiment are achieved.

Since the protrusions 30 are further protruded outward in the electronic component 10B according to the third preferred embodiment, compared with those in the electronic component 10 according to the first preferred embodiment, the ridge lines and the corners are easily protected by the protrusions 30. Accordingly, in the electronic component 10B according to the third preferred embodiment, it is possible to reduce or prevent the abrasion of the ridge lines and the corners of the first outer electrode 21a and the second outer electrode 21b, compared with the electronic component 10 according to the first preferred embodiment.

The present invention is not limited to the above preferred embodiments and various applications and modifications are available within the scope of the present invention. For example, although the multilayer ceramic capacitor is exemplified as the electronic component of the present invention in each preferred embodiment described above, the electronic component is not limited to the multilayer ceramic capacitor and it is sufficient for the electronic component to have a structure in which a first outer electrode is provided at one side of the main body and a second outer electrode is provided at the other side of the main body in an electromagnetic interference (EMI) filter, a piezoelectric element, or the like. The structure of the main body is not limited to the structure in which the multiple dielectric layers and the multiple inner electrodes are alternately laminated.

The shapes of the protrusions 30 of the first outer electrode 21a and the second outer electrode 21b are not limited to the shapes described in the respective preferred embodiments described above. For example, although each of the first protrusion 31a protruding in the direction orthogonal to or substantially orthogonal to the first main surface 16a, the second protrusion 32a protruding in the direction orthogonal to or substantially orthogonal to the second main surface 16b, the third protrusion 33a protruding in the direction orthogonal to or substantially orthogonal to the first side surface 17a, and the fourth protrusion 34a protruding in the direction orthogonal to or substantially orthogonal to the second side surface 17b has a shape with one apex on the cross section when the first outer electrode 21a is cut off along the plane parallel to the first end surface 15a and the second end surface 15b in the first preferred embodiment, each of the first protrusion 31a, the second protrusion 32a, the third protrusion 33a, and the fourth protrusion 34a may have a shape with multiple apexes. The same applies to the first protrusion 31b to the fourth protrusion 34b of the second outer electrode 21b.

Although the first outer electrode 21a and the second outer electrode 21b are provided on the surface of the main body 11 in the respective preferred embodiments described above, another outer electrode may additionally be provided.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electronic component comprising:
    a main body including a first end surface and a second end surface opposed to each other in a length direction, a first side surface and a second side surface opposed to each other in a width direction, and a first main surface and a second main surface opposed to each other in a thickness direction and that has a substantially rectangular parallelepiped shape;
    a first outer electrode provided at a first end side in the length direction of the main body; and
    a second outer electrode provided a second end side in the length direction of the main body; wherein
    each of the first outer electrode and the second outer electrode includes a first protrusion protruding in a direction orthogonal to or substantially orthogonal to the first main surface, a second protrusion protruding in a direction orthogonal to or substantially orthogonal to the second main surface, a third protrusion protruding in a direction orthogonal to or substantially orthogonal to the first side surface, and a fourth protrusion protruding in a direction orthogonal to or substantially orthogonal to the second side surface; and
    at least one of the first protrusion, the second protrusion, the third protrusion, and the fourth protrusion extends across an entirety of a surface of the corresponding first or second outer electrode in the length direction.

2. The electronic component according to claim 1, wherein at least one of the first protrusion, the second protrusion, the third protrusion, and the fourth protrusion includes a surface with an arc shape on a cross section when each of the first outer electrode and the second outer electrode is cut off along a plane parallel to or substantially parallel to the first end surface and the second end surface.

3. The electronic component according to claim 1, wherein at least one of the first protrusion, the second protrusion, the third protrusion, and the fourth protrusion has a substantially rectangular shape on a cross section when each of the first outer electrode and the second outer electrode is cut off along a plane parallel to or substantially parallel to the first end surface and the second end surface.

4. The electronic component according to claim 1, wherein at least one of the first protrusion, the second protrusion, the third protrusion, and the fourth protrusion has a substantially rectangular shape and includes a surface with an arc shape at an opposite side of the main body on a cross section when each of the first outer electrode and the second outer electrode is cut off along a plane parallel to or substantially parallel to the first end surface and the second end surface.

5. The electronic component according to claim 1, wherein
the electronic component is a multilayer ceramic capacitor;
the main body includes first inner electrodes and second inner electrodes alternately laminated in the thickness direction and dielectric layers between the first inner electrodes and the second inner electrodes;
the first inner electrodes extend to the first end surface to be electrically connected to the first outer electrode; and
the second inner electrodes extend to the second end surface to be electrically connected to the second outer electrode.

6. The electronic component according to claim 1, wherein at least one of the first protrusion, the second protrusion, the third protrusion, and the fourth protrusion differs from remaining ones of the first protrusion, the second protrusion, the third protrusion, and the fourth protrusion in at least one of a shape and a size.

7. The electronic component according to claim 1, wherein corners and ridge lines of the main body are rounded and a shape of a rectangular parallelepiped including rounded corners and ridge lines is included in the substantially rectangular parallelepiped shape.

8. The electronic component according to claim 1, wherein the first outer electrode and the second outer electrode each include a base electrode layer and a plating layer on the base electrode layer.

9. The electronic component according to claim 8, wherein the base electrode layers include at least one of a baking electrode layer, a resin electrode layer, and a thin-film electrode layer.

10. The electronic component according to claim 8, wherein each of the plating layers include a two-layer structure.

11. The electronic component according to claim 10, wherein the two-layer structure includes a Ni plating layer and a Sn plating layer.

12. The electronic component according to claim 10, wherein depressions are defined in the first outer electrode and the second outer electrode.

13. The electronic component according to claim 12, wherein the depressions are defined between adjacent ones of the first protrusions through the fourth protrusion portions of the first outer electrode and the second outer electrode.

* * * * *